June 4, 1968  D. W. TESDALL  3,387,205
CURRENT LIMITER WITH REDUCTION OF POWER APPLIED TO A LOAD
Filed Dec. 2, 1965  3 Sheets-Sheet 1
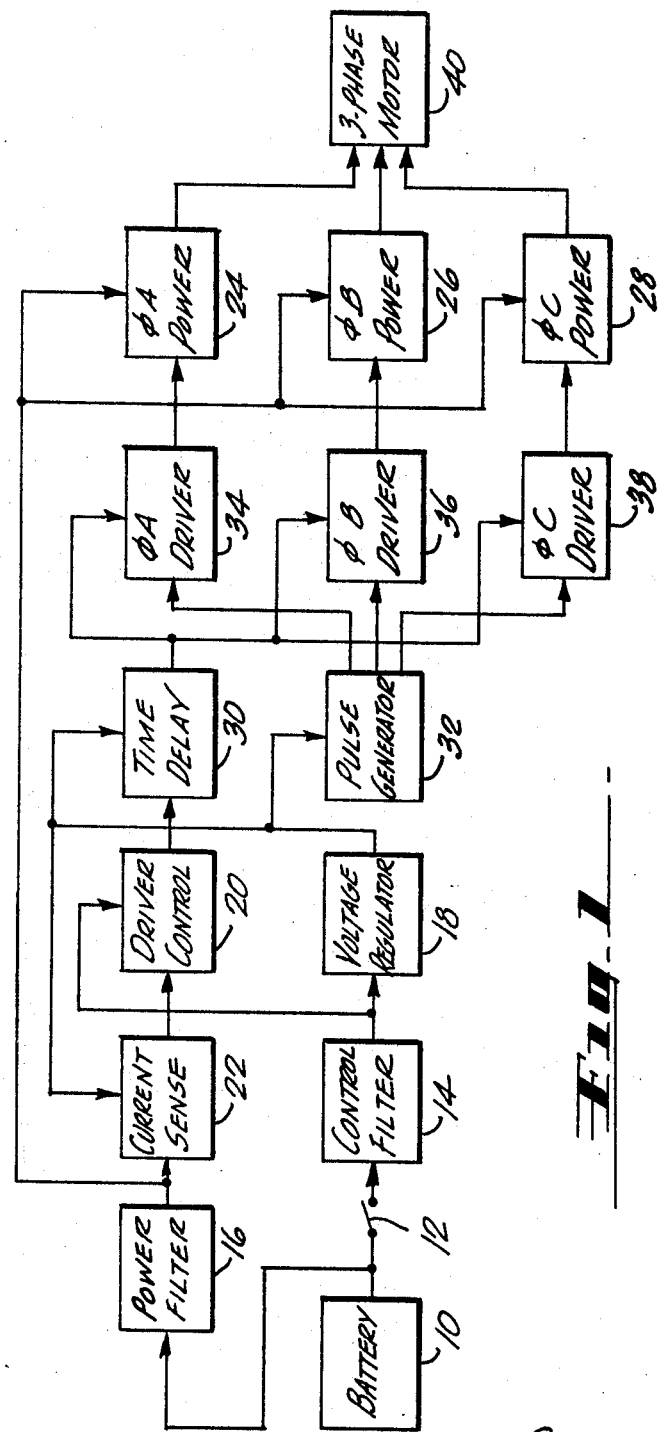
INVENTOR.
DARRELL W. TESDALL
BY
- AGENT -

June 4, 1968  D. W. TESDALL  3,387,205
CURRENT LIMITER WITH REDUCTION OF POWER APPLIED TO A LOAD
Filed Dec. 2, 1965  3 Sheets-Sheet 2

INVENTOR.
DARRELL W. TESDALL
BY
- AGENT -

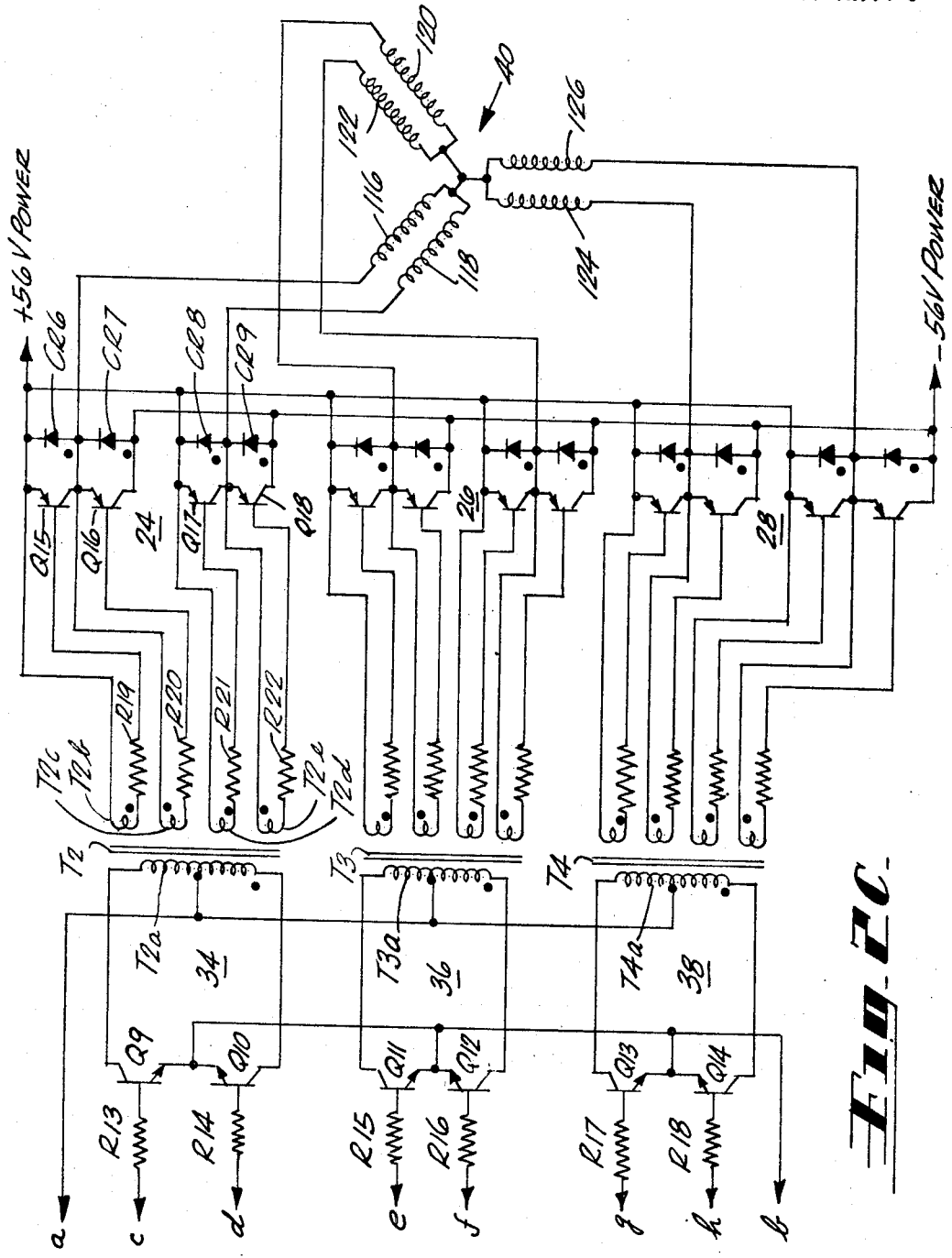

United States Patent Office 3,387,205
Patented June 4, 1968

3,387,205
CURRENT LIMITER WITH REDUCTION OF
POWER APPLIED TO A LOAD
Darrell W. Tesdall, Garden Grove, Calif., assignor, by
mesne assignments, to McDonnell Douglas Corporation, Santa Monica, Calif., a corporation of Maryland
Filed Dec. 2, 1965, Ser. No. 511,094
4 Claims. (Cl. 323—9)

ABSTRACT OF THE DISCLOSURE

A current limiter including means for sensing current flow to a load and producing an output signal whenever the current flow reaches a predetermined level, and means responsive to the output signal for briefly removing the input power from the load and thus hold peak currents below the predetermined level. The input power is applied to the load through time delay means which is operated, after a selected time interval following initial energization thereof, to reduce the amount of input power applied thereafter to the load and hence increase overall circuit efficiency.

---

My present invention relates generally to static inverters and more particularly to a current limiter for inverter circuits and the like. The invention described herein was made in the performance of work under a NASA contract and is subject to the provisions of Section 305 of the National Aeronautics and Space Act of 1958, Public Law 58–568 (72 Stat. 435; 42 U.S.C. 2457).

Static inverters are often used to drive an alternating current motor or other similar loads requiring a much higher starting than running current. During the start of an induction motor, for example, the inverter is normally required to drive approximately four or five times its nominal load. In order to protect the output power transistors of the static inverter during the motor start condition, a current limiter is needed to limit the peak currents flowing through the power transistors to a level below the maximum current carrying capabilities of the output power transistors. However, this must be accomplished without impeding the motor from quickly and effectively achieving its proper running speed.

It is an object of my invention to provide a novel and useful current limiter for an inverter circuit driving a motor load wherein the limiter effectively limits the peak current to the motor load to a value below a predetermined level during the start of the motor, without impeding the motor from quickly and efficiently reaching its normal running speed.

Another object of the invention is to provide an adjustable current limiter for an inverter circuit wherein the limiter can be easily adjusted to set the level of the load current of the inverter circuit at which the inverter circuit is effectively turned off for a predetermined duration.

A further object of this invention is to provide a current limiter for an inverter circuit wherein power is removed from driver stages of the inverter circuit for a predetermined duration by the current limiter whenever the limiter senses that its load current has reached a predetermined level.

A still further object of the invention is to provide a high efficiency circuit for driving a motor load wherein peak load current will be limited to a value below a predetermined level during the start of the motor and the supply voltage applied to the motor can be automatically reduced after a predetermined time following the start of the motor to reduce power dissipation and increase overall efficiency.

Figure 2A:
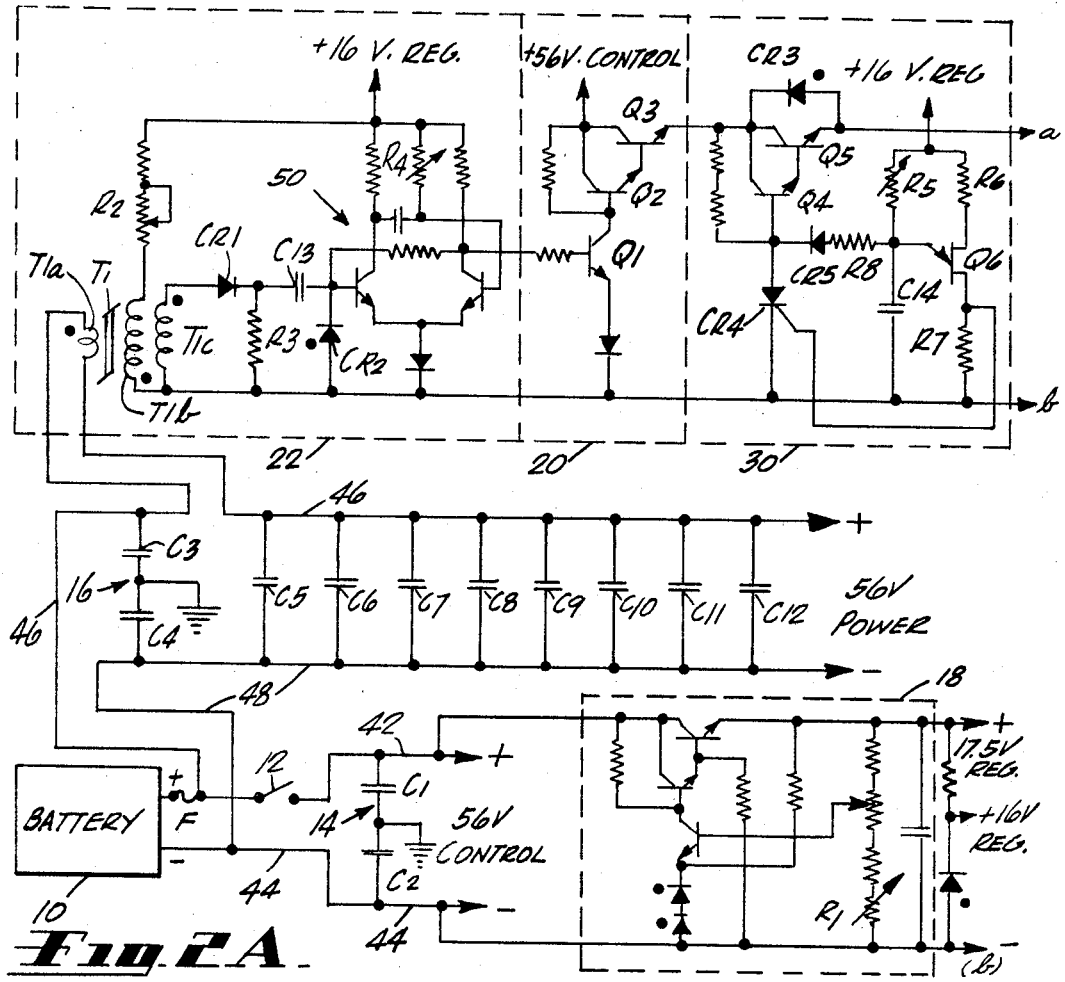
Figure 2B:
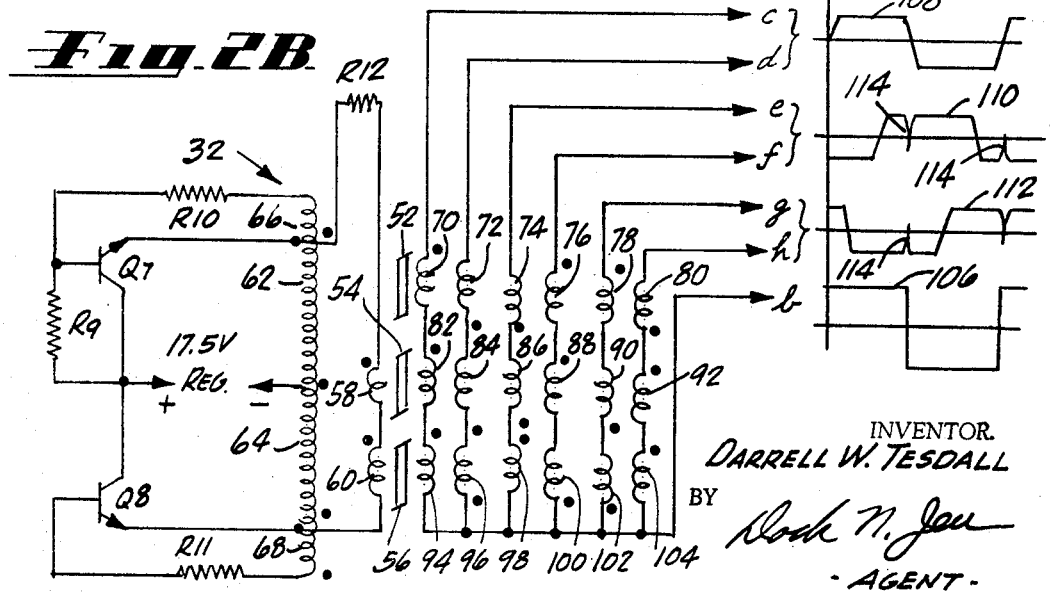

Other objects, features and advantages of my invention will become apparent from the following detailed description of an illustrative embodiment of this invention. The invention will be more fully understood by reading the description with simultaneous reference to the accompanying drawings, in which:

FIGURE 1 is a block diagram of an inverter circuit including a current limiter according to my invention; and FIGURES 2A, 2B and 2C, together, comprise a detailed wiring diagram of a preferred embodiment of the inverter circuit broadly shown in FIGURE 1.

FIGURE 1 is a single-line block diagram of an inverter circuit including a current limiter according to my invention. A direct current source 10 which is, for example, a 56 volt battery has its output connected through control switch 12 to a control filter 14 and directly to a power filter 16 as shown. The output of the control filter 14 is applied to a voltage regulator 18 and also supplies driver control means 20. The output of the power filter 16 is applied to current sense means 22 and also supplies phase A power stage 24, phase B power stage 26 and phase C power stage 28. The output of the voltage regulator 18 supplies, for example, a constant 16 volts to the current sense means 22 and time delay means 30, and a temperature variable 17.5 volts to the pulse generator 32.

The current sense means 22 senses when a predetermined level or magnitude of power current is reached for the inverter circuit and produces an output signal to the driver control means 20 which then briefly removes the input power (applied through the delay means 30) from the driver stages 34, 36 and 38. After a predetermined off time of, for example, 100 microseconds, the driver control means 20 and the driver stages are turned back on and the cycle would be repeated if the power current again reached the predetermined level. In this way, the current ratings of the output transistors in the output stages 24, 26 and 28 would not be exceeded during, for example, the start of the three phase motor 40. The time delay means 30 operates during the start of the motor 40 to supply full drive power to the drive stages 34, 36 and 38 which drive the power stages 24, 26 and 28 that power the motor 40 until after a predetermined time of about 5 seconds, for example, when the motor 40 reaches proper operating speed. The drive power is then decreased, thus reducing dissipation and increasing the overall efficiency of the inverter circuit.

The pulse generator 32 produces a three phase, quasi-square wave output wherein phase A is applied to the driver stage 34, phase B is applied to the driver stage 36 and phase C is applied to the driver stage 38. The amplified outputs of the driver stages 34, 36 and 38 are respectively applied to the power stages 24, 26 and 28 which power the three phase motor 40. An exemplary embodiment of the pulse generator 32 is shown, described and claimed in the co-pending patent application Ser. No. 258,528 filed on Feb. 14, 1963, of Paul E. Lorentzen for Magnetic Sequential Pulse Generator, now Patent No. 3,329,828. An inverter circuit including a description and illustration of a form of the driver stages 34, 36 and 38, and power stages 24, 26 and 28 driving a three phase motor is provided in the co-pending patent application Ser. No. 258,719 filed on Feb. 15, 1963, of Paul E. Lorentzen and Darrell W. Tesdall for Static Inverter System, now Patent No. 3,323,033.

FIGURES 2A, 2B and 2C, together, comprise a detailed wiring diagram of a preferred embodiment of the inverter circuit broadly shown in FIGURE 1. These three figures can be interconnected by joining similarly labeled lead ends together. For example, the leads a and b of FIGURE 2A are to be connected to the correspondingly labeled leads in FIGURE 2C. Similarly, the leads c, d, e, f, g, h and b of FIGURES 2B are to be connected to the correspondingly labeled leads in FIGURE 2C. The lead b is the common, negative, return lead for the inverter circuit and appears in all three FIGURES 2A, 2B and 2C.

FIGURE 2A shows the battery 10 connected through a fuse F to control swtich 12 and thence to the control filter 14 which includes capacitors C1 and C2 connecting positive and negative leads 42 and 44 respectively to ground. The control filter 14 suppresses radio frequency interference signals and the capacitors C1 and C2 are used to attenuate the high frequency interference signals for that purpose. The leads 42 and 44 provide the control power of, for example, 56 volts for the inverter circuit.

The leads 42 and 44 are also connected to the input of voltage regulator 18 which is essentially conventional in circuitry as will be apparent from FIGURE 2A. For this reason, a description of the regulator 18 circuit is not believed to be necessary. It may be noted, however, that the regulator 18 includes a temperature sensitive resistor R1 which is actually embedded physically in the potting near the cores of the transformer of the pulse generator 32. Thus, the 17.5 volts output voltage of the regulator 18 is varied in proportion to the temperature change of the cores of the pulse generator transformer but the following 16 volts output voltage is held constant by a breakdown diode.

The flux density of the cores and the frequency of the pulse generator 32 are inversely proportional to temperature. The frequency of the generator 32, however, is directly proportional to its supply voltage. Since the temperature variable output voltage of the regulator 18 supplies the pulse generator 32, as will be described later, the frequency of the generator 32 will be maintained at, for example, 400 c.p.s.±1 percent by operation of the temperature sensitive resistor R1 and the regulator 18.

The battery 10 is also connected directly to the power filter 16 which includes capacitors C3 and C4, connecting the positive and negative leads 46 and 48 respectively to ground, and capacitors C5, C6, C7, C8, C9, C10, C11 and C12 connected across the leads 46 and 48. The capacitors C3 and C4 suppress radio frequency interference signals and the capacitors C5 through C12 suppress low frequency interference signals and also provide power factor correction, particularly during the starting of motor 40, in that they serve as a sink for the reactive currents returning to the power supply, or battery 10 in this instance.

The current sense means 22 includes a saturable core transformer T1 and a one-shot multivibrator 50. The primary winding T1a of the transformer T1 is, for example, a one-turn winding which is connected in series with the positive lead 46 from the battery 10. The transformer T1 has a bias winding T1b connected in series with an adjustable resistor R2 and this series combination is adapted to be connected to the constant 16 volts obtained from the regulated output voltage of the regulator 18. The output winding T1c of the transformer T1 is connected through a diode CR1 and series capacitor C13 to the one-shot multivibrator 50.

When the current flowing through the primary winding T1a exceeds a predetermined level established by the setting of the resistor R2, a pulse is generated in the transformer T1 and this pulse is applied to the one-shot multivibrator 50 to trigger the same to produce an output signal therefrom. The resistor R2 sets the bias current and, therefore, the condition of the core of transformer T1 at a particular point in the negative saturation region of the core's B-H hysteresis loop. When the current in the primary winding T1a is increased to overcome the magnetomotive force of the bias winding T1b and the coercive force of the core, an output voltage is produced as the core is switched from negative to positive saturation. The pulse width of the output voltage is inversely proportional generally to the output voltage which is dependent on the input voltage, turn ratio and the transformer circuit parameters.

A breakdown diode CR2 connects one plate of the capacitor C13 to the common negative lead b as shown in FIGURE 2A. Resistor R3 connects the other plate of the capacitor C13 to the lead b. The diode CR2 serves to protect the one-shot multivibrator 50 from any overvoltage condition appearing through the output winding T1c and also provides with the resistor R3, a leakage or discharge path for the capacitor C13.

When the one-shot multivibrator 50 is triggered, it produces a positive pulse of 100 microseconds duration, for example. This pulse is applied to transistor Q1 of the driver control means 20. When the transistor Q1 is energized, the base drive is removed from the Darlington connection of transistors Q2 and Q3. Thus, the 56 volts control power is removed from the time delay means 30 and hence the driver stages 34, 36 and 38, turning the inverter circuit off briefly for 100 microseconds. Of course, if the one-shot multivibrator 50 is triggered again, the cycle is repeated. The multivibrator 50 output pulse duration can be varied by adjustment of resistor R4. A brief off interval of, for example, 100 microseconds was found satisfactory in holding the peak currents below the predetermined level and yet not impede the motor 40 from quickly and effectively reaching its proper running speed during the start of the motor.

The time delay means 30 also includes a Darlington connection of transistors Q4 and Q5, the latter being paralleled by a breakdown diode CR3 as shown in FIGURE 2A. The emitter of the transistor Q5 is connected to lead a and the base of the transistor Q4 is connected to lead b through a silicon controlled rectifier CR4.

The controlled rectifier CR4 is controlled by a timing circuit including unijunction transistor Q6. The +16 volts supply voltage is connected to the emitter of the unijunction transistor Q6 through adjustable resistor R5 and to the first base through resistor R6. The emitter is connected to lead b through capacitor C14 and the second base is connected to lead b through resistor R7. The emitter is also connected to the anode of the controlled rectifier CR4 through a resistor R8 and series diode CR5. The gate of the controlled rectifier CR4 is connected to the second base of the unijunction transistor Q6.

During the starting of the motor 40, the transistor Q5 is saturated and the control power from transistor Q3 of the driver control means 20 is applied through leads a and b to supply full voltage to the driver stages 34, 36 and 38 such that they are operated at maximum output. The capacitor C14 charges for about 5 seconds, for example, until it reaches a voltage which fires the unijunction transistor Q6. This produces an output signal which is applied to the gate of the controlled rectifier CR4 and fires the same. The base drive of the transistor Q5 is thus removed and the breakdown diode CR3 is placed in series with the control power from the transistor Q3. The charging time of the capacitor C14 can, of course, be varied through adjustment of the resistor R5.

The breakdown diode CR3, when placed in series, drops the voltage applied to the driver stages 34, 36, and 38 by the amount of the breakdown voltage such that the voltage to the driver stage is approximately one half the value originally supplied through the transistor Q5. However, sufficient drive is provided from the driver stages 34, 36 and 38 in this condition to operate the power stages 24, 26 and 28 to run the motor 40 at normal operating speed. The timing circuit only produces a single output signal during starting since the resistor R8 and series diode CR5 and the fired (conducting) controlled rectifier CR4; and prevent the capacitor C14 from charging to a voltage which again fires the unijunction transistor Q6.

FIGURE 2B shows a version of the pulse generator 32 which produces a three phase output directly therefrom. This version is similar to the pulse generator shown and described in the patent application Ser. No. 258,528, now Patent No. 3,329,828 previously identified above. In this particular embodiment, the three saturable cores 52, 54 and 56 which are stacked one on top of the other have bias windings 58 and 60 provided only on the cores 54 and 56, respectively, as indicated. The bias winding 60 has a predetermined greater number of turns than the bias winding 58 such that the hysteresis loop for core 52 will be centered on the B–H axes, the loop for core 54 will be displaced a certain amount on the H-axis, and the loop for core 56 can be further displaced a similar amount from the loop for core 58.

The transistors Q7 and Q8 are connected to primary windings 62 and 64 in an oscillator circuit as shown in FIGURE 2B. The oscillator circuit is supplied by the temperature varied, nominal 17.5 volts regulated output voltage of the regulator 18 shown in FIGURE 2A. Start resistor R9 is connected between the base of the transistor Q7 and the collectors of the transistors Q7 and Q8. Feedback windings 66 and 68 are connected from the emitters of the transistors Q7 and Q8 through respective resistors R10 and R11 to the bases of these transistors. A can be seen from FIGURE 2B, the series combination of bias windings 58 and 60, and limiting resistor R12 is connected to the outer ends of the primary windings 62 and 64.

Output windings 70, 72, 74, 76, 78 and 80 are wound on the core 52, output windings 82, 84, 86, 88, 90 and 92 are wound on the core 54, and output windings 94, 96, 98, 100, 102 and 104 are wound on the core 56. These 18 output windings are connected in the manner and with the polarities indicated in FIGURE 2B to provide resultant output leads $b$, $c$, $d$, $e$, $f$, $g$ and $h$. For a voltage waveform 106 appearing across the series primary windings 62 and 64, output voltage waveforms 108, 110 and 112 are produced between the leads $c$ and $d$, $e$ and $f$, and $g$ and $h$ as illustrated. The small spikes 114 are believed to be caused by the sharp reversals in polarity of the primary voltage waveform 106. These small spikes 114 are negligible and have no noticeable effects on the function and effectiveness of the three phase output signals illustrated by the waveforms 108, 110 and 112. The small spikes 114 have been shown mainly for completeness of description.

FIGURE 2C is a wiring diagram of the driver stages 34, 36 and 38 driving the power stages 24, 26 and 28, respectively, which are directly connected to energize the three phase motor 40. The inverter circuit shown and described in the previously identified patent application Ser. No. 258,719, now Patent No. 3,323,033 includes driver and power stages and a three phase load which are similar to those shown in FIGURE 2C. However, an output transformer is not used in the circuit of FIGURE 2C to couple the power stages to the three phase motor in order to save weight and reduce cost. Also, the motor 40 has Y connected windings wherein each phase branch includes a pair of parallel windings which are not tied together at the ends. Thus, each of the power stages 24, 26 and 28 actually contains two duplicate output stages which are used to power respective windings of the pair of parallel windings of a corresponding phase of the motor 40.

The leads $a$, $b$, $c$, $d$, $e$, $f$, $g$ and $h$ in FIGURE 2C are, of course, to be connected to similarly labeled leads in FIGURES 2A and 2B. The lead $b$ is the common, negative, return lead for the inverter circuit. The leads $c$, $d$, $e$, $f$, $g$ and $h$ from FIGURE 2B are connected to the bases of transistors Q9, Q10, Q11, Q12, Q13 and Q14 through respective resistors R13, R14, R15, R16, R17 and R18 as indicated in FIGURE 2C.

These transistors are connected in pairs to the primary windings T2a, T3a and T4a of transformers T2, T3 and T4 in push-pull square amplifier circuits as shown in FIGURE 2C. The amplifier driver stage 34 is thus directly driven by the output signal having a waveform 108 from the pulse generator 32 and, similarly, the amplifier driver stages 36 and 38 are directly driven by the output signals of waveforms 110 and 112 from the pulse generator. The driver stages 34, 36 and 38 are supplied on leads $a$ and $b$ from the output of the time delay means 30 (FIGURE 2A).

The transformers T2, T3 and T4 each has a C core design including an air gap which eliminates the possibility of a transformer saturating due to a voltage imbalance. These transformers each have four secondary windings as indicated in FIGURE 2C. One end of the secondary winding T2b is connected to the base of transistor Q15 through resistor R19. The other end of the secondary winding T2b is connected to the emitter of the transistor Q15. Similarly, one end of the secondary winding T2c is connected through resistor R20 to the base of transistor Q16 and the other end of the secondary winding T2c is connected to the emitter of the transistor Q16. The polarities of the secondary windings T2b and T2c are opposite in relationship to their connections to the bases of the transistors Q15 and Q16.

The emitter of the transistor Q15 is connected to +56 volts from the power filter 14 (FIGURE 2A) and the collector of the transistor Q16 is connected to −56 volts of the power filter 14. The collector of the transistor Q15 and the emitter of the transistor Q16 are both connected to the free end of the phase A winding 116 as shown in FIGURE 2C. Breakdown diodes CR6 and CR7 are connected between the collectors and emitters of the transistors Q15 and Q16, respectively. For an inductive load, reactive currents will attempt to return to the power supply during certain parts of a cycle. The diodes CR6 and CR7 handle these reactive (inductive) currents in the forward direction of their illustrated orientation. In the reverse or breakdown direction, the diodes CR6 and CR7 protect the power transistors Q15 and Q16, respectively, from an over-voltage condition which could cause the failure of the transistors.

When the lead $c$ is positive relative to lead $d$, as during the first half cycle of the waveform 108, the transistor Q9 conducts and the transistor Q10 does not. For the polarity markings indicated by the windings of the transformer T2, it will be seen that the transistor Q16 then conducts current from the phase A winding 116. During the negative half cycle of the waveform 108, the transistor Q15 conducts current to the phase A winding 116 while the transistor Q16 does not conduct.

The secondary windings T2d and T2e are coupled to transistors Q17 and Q18 through respective resistors R21 and R22 in the same manner as the secondary windings T2b and T2c are coupled to the transistors Q15 and Q16. The breakdown diodes CR8 and CR9 are respectively connected across the transistors Q17 and Q18, and the emitter of Q17 is connected to +56 volts from the power filter 16 (FIGURE 2A) while the collector of transistor Q18 is connected to −56 volts of the power filter 16 as shown in FIGURE 2C.

The outer end of the phase A winding 118 is connected to the collector of the transistor Q17 and the emitter of the transistor Q18 just as the phase A winding 116 is connected to similar connections of the transistors Q15 and Q16. The circuits involving the secondary windings T2d and T2e, and the transistors Q17 and Q18 are duplicates of those involving the secondary windings T2b and T2c, and the transistors Q15 and Q16. The phase A windings 116 and 118 are both energized in the same manner with similar signals.

The power stages 26 and 28 are connected identically to the power stage 24 which was described in detail above. The power stage 26 energizes the phase B windings 120 and 122, and the power stage 28 energizes the phase C windings 124 and 126. However, the input signal to the driver stage 36 on leads $e$ and $f$ has the waveform 110 shown in FIGURE 2B, and the input signal to the driver stage 38 has the waveform 112. The waveform 110 is displaced 120 degrees from the waveform 108, and the waveform 112 is displaced 120 degrees from the waveform 110.

These three phase input signals with waveforms 110 and 112 are provided respectively to the driver stages 36 and 38 shown in FIGURE 2C to produce corresponding, amplified signals from the power stages 26 and 28 to energize the phase A and phase B windings of the three phase motor 40 in a similar manner as was described above with respect to the phase A windings. Although an isolating output transformer was not used to couple the power stages 24, 26 and 28 to the motor 40, the three phase signals from these power stages can, of course, be applied to a suitable three phase transformer.

Although I have shown and described a particular embodiment of my invention, it is to be understood that the invention is not limited to the specific features shown, but that various changes in design, structure and arrangement may be made without departing from the principles involved or sacrificing any of its advantages. The invention is, therefore, claimed in any of its forms or modifications within the legitimate and valid scope of the appended claims.

I claim:
1. A current limiter comprising:
   means for sensing current flow to a load and producing an output signal when the current flow reaches a predetermined level; and
   means responsive to said output signal for reducing the magnitude of current flow to the load, said responsive means for reducing the magnitude of current flow to the load includes switching means having power applied thereto, and time delay means connecting said switching means to the load to apply the power to the same, said switching means being operatively responsive to remove the power from said delay means when said output signal is being applied to said switching means and said delay means being operatively responsive after a predetermined delay following energization thereof to reduce the power from said switching means being applied to the load to a continuous lower operating power level whereby overall circuit efficiency is increased.

2. The invention as defined in claim 1 wherein said sensing means includes a saturable core transformer adapted to sense the current flow to the load and produce a transformer output signal when the current flow reaches a predetermined level, and a one-shot multivibrator adapted to be triggered by the transformer output signal to produce an output signal of a predetermined duration for application to said responsive means for reducing the magnitude of current flow to the load.

3. A current limiter comprising:
   means for sensing current flow to a load and producing an output signal when the current flow reaches a predetermined level; and
   means responsive to said output signal for reducing the magnitude of current flow to the load, said sensing means including a saturable core transformer having a primary winding, bias winding and an output winding, said primary winding being connected to sense the current flow to the load, said bias winding being energized to establish a predetermined level of current flow at which said transformer is responsive to produce an output signal therefrom, and said output winding being connected to apply said output signal to said responsive means for reducing the magnitude of current flow to the load, and said responsive means for reducing the magnitude of current flow to the load including switching means having power applied thereto, and time delay means connecting said switching means to the load to apply the power to the same, said switching means being operatively responsive to remove the power from said delay means when said output signal is being applied to said switching means and said delay means being operatively responsive after a predetermined delay following energization thereof to reduce the power from said switching means being applied to the load.

4. The invention as defined in claim 3 wherein said sensing means includes, in addition, a one-shot multivibrator adapted to be triggered by the transformer output signal to produce an output signal of a predetermined duration for application to said switching means of said responsive means for reducing the magnitude of current flow to the load.

References Cited

UNITED STATES PATENTS

| | | | |
|---|---|---|---|
| 2,608,676 | 8/1952 | MacCallum et al. | 323—56 X |
| 2,915,693 | 12/1959 | Harrison | 323—9 |
| 2,943,250 | 6/1960 | Fath | 318—434 X |
| 3,144,599 | 8/1964 | Brahm | 323—22 X |
| 3,205,424 | 9/1965 | Bates | 321—18 |
| 3,253,208 | 5/1966 | Britten et al. | 321—18 X |

JOHN F. COUCH, *Primary Examiner.*

WARREN E. RAY, *Examiner.*

A. D. PELLINEN, *Assistant Examiner.*